(12) United States Patent
Kehl

(10) Patent No.: US 8,883,061 B2
(45) Date of Patent: Nov. 11, 2014

(54) COVER ASSEMBLIES FOR ELECTRICAL CABLES AND METHODS AND KITS INCLUDING SAME

(75) Inventor: Ladislaus Kehl, Dorfen (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 184 days.

(21) Appl. No.: 13/303,822

(22) Filed: Nov. 23, 2011

(65) Prior Publication Data

US 2013/0126210 A1    May 23, 2013

(51) Int. Cl.
*B29C 45/14*    (2006.01)
*B29C 63/20*    (2006.01)
*B29C 65/00*    (2006.01)

(52) U.S. Cl.
USPC ...... 264/263; 264/267; 264/275; 264/272.14; 264/272.15; 264/102

(58) Field of Classification Search
None
See application file for complete search history.

(56) References Cited

U.S. PATENT DOCUMENTS

| | | | |
|---|---|---|---|
| 3,446,741 A * | 5/1969 | Hervig et al. ................. 523/223 |
| 3,634,603 A | 1/1972 | Bentvelsen |
| 4,268,041 A | 5/1981 | Sovish et al. |
| 4,383,131 A | 5/1983 | Clabburn |
| 4,390,745 A | 6/1983 | Böttcher et al. |
| 4,431,861 A | 2/1984 | Clabburn et al. |
| 4,576,993 A | 3/1986 | Tamplin et al. |
| 4,589,939 A | 5/1986 | Mohebban et al. |
| 4,714,800 A | 12/1987 | Atkins et al. |
| 4,791,245 A | 12/1988 | Thornley |
| 4,847,450 A | 7/1989 | Rupprecht |
| 4,943,685 A * | 7/1990 | Reynaert ......................... 174/19 |
| 5,070,597 A | 12/1991 | Holt et al. |
| 6,501,024 B1 * | 12/2002 | Evans ............................. 174/76 |
| 6,759,595 B2 * | 7/2004 | Goehlich et al. .............. 174/168 |
| 6,864,432 B2 | 3/2005 | Boettcher et al. |
| 7,361,836 B2 * | 4/2008 | Goehlich .................... 174/74 R |

FOREIGN PATENT DOCUMENTS

| | | |
|---|---|---|
| DE | 20 53 896 A1 | 4/1972 |
| EP | 0 121 986 A1 | 10/1984 |
| GB | 2 336 252 A | 10/1999 |
| WO | WO 2004/004088 A1 | 1/2004 |

OTHER PUBLICATIONS

Notification of Transmittal of the International Search Report and the Written Opinion of the International Searching Authority, or the Declaration, PCT/EP2012/072978, Date of Mailing: Sep. 3, 2013, 12 pages.

* cited by examiner

*Primary Examiner* — Edmund H. Lee
(74) *Attorney, Agent, or Firm* — Myers Bigel Sibley & Sajovec, PA

(57) ABSTRACT

A method for forming a cover assembly on an electrical power transmission cable includes: mounting a tubular cover member around the cable such that a portion of the cover member defines a cavity surrounding the cable; providing a flowable electrical stress grading material in the cavity; and applying a vacuum to the cavity to evacuate air from the cavity and compact the electrical stress grading material in the cavity.

21 Claims, 11 Drawing Sheets

COVER ASSEMBLIES FOR ELECTRICAL CABLES AND METHODS AND KITS INCLUDING SAME

FIELD OF THE INVENTION

The present invention relates to electrical cables and, more particularly, to connections and covers for electrical transmission cables.

BACKGROUND OF THE INVENTION

Terminations for high voltage (i.e., greater than about 12 kV) polymeric insulated electrical transmission cables are typically accomplished by cutting back an outer polymeric jacket, neutral conductors, a semiconductive layer, and a primary polymeric insulation layer to expose a primary conductor, on which an electrical connector is installed. The exposed components of the cable must be protected. For high voltage cables, such protection typically requires electrical stress control at the termination and various stress control elements have been provided for this purpose.

Stress control elements may be based on high permittivity polymers (refractive stress control), slightly conductive polymers (resistive stress control), combinations of those, or a combination of conductive and insulating polymers (geometric stress control). Cover systems including polymeric heat shrinkable tubes with metal-oxide filled mastics (e.g., Uniterm IXSU/OXSU or HVT-Z termination accessories from TE Connectivity termination accessories available from TE Connectivity) have been used to form stress controlled terminations and capitalize on the high permittivity and the non-linear electrical behavior of metal-oxide powders. Covers have also been provided including flexible cold shrink tubes including metal-oxide powder embedded in an elastomeric matrix.

Range taking cable termination accessories are often preferred because they reduce required inventory.

Self-supporting, dry cable terminations are often preferred over liquid-filled or flexible terminations.

SUMMARY OF THE INVENTION

According to embodiments of the present invention, a method for forming a cover assembly on an electrical power transmission cable includes: mounting a tubular cover member around the cable such that a portion of the cover member defines a cavity surrounding the cable; providing a flowable electrical stress grading material in the cavity; and applying a vacuum to the cavity to evacuate air from the cavity and compact the electrical stress grading material in the cavity.

According to embodiments of the present invention, a kit for forming a cover assembly on an electrical power transmission cable includes a tubular cover member configured to be mounted around the cable such that a portion of the cover member defines a cavity surrounding the cable, and a flowable electrical stress grading material to fill the cavity. The electrical stress grading material is a flowable powder and/or granulate.

According to method embodiments of the present invention, a method for forming a cover assembly on an electrical power transmission cable includes mounting a tubular cover member around the cable such that a portion of the cover member defines a cavity surrounding the cable; and thereafter filling the cavity with a flowable electrical stress grading material.

According to embodiments of the present invention, a cable assembly includes an electrical power transmission cable, a tubular cover member mounted on and surrounding a portion of the cable; and a nonbound filler material contained by the cover member around the portion of the cable. The filler material is a powder and/or granulate.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 3-7 are partial cross-sectional views illustrating methods for installing the cover system on the cable of FIG. 2, wherein FIG. 7 is a partial cross-sectional view of the fully installed cover system.

DETAILED DESCRIPTION OF EMBODIMENTS OF THE INVENTION

Figure 1:
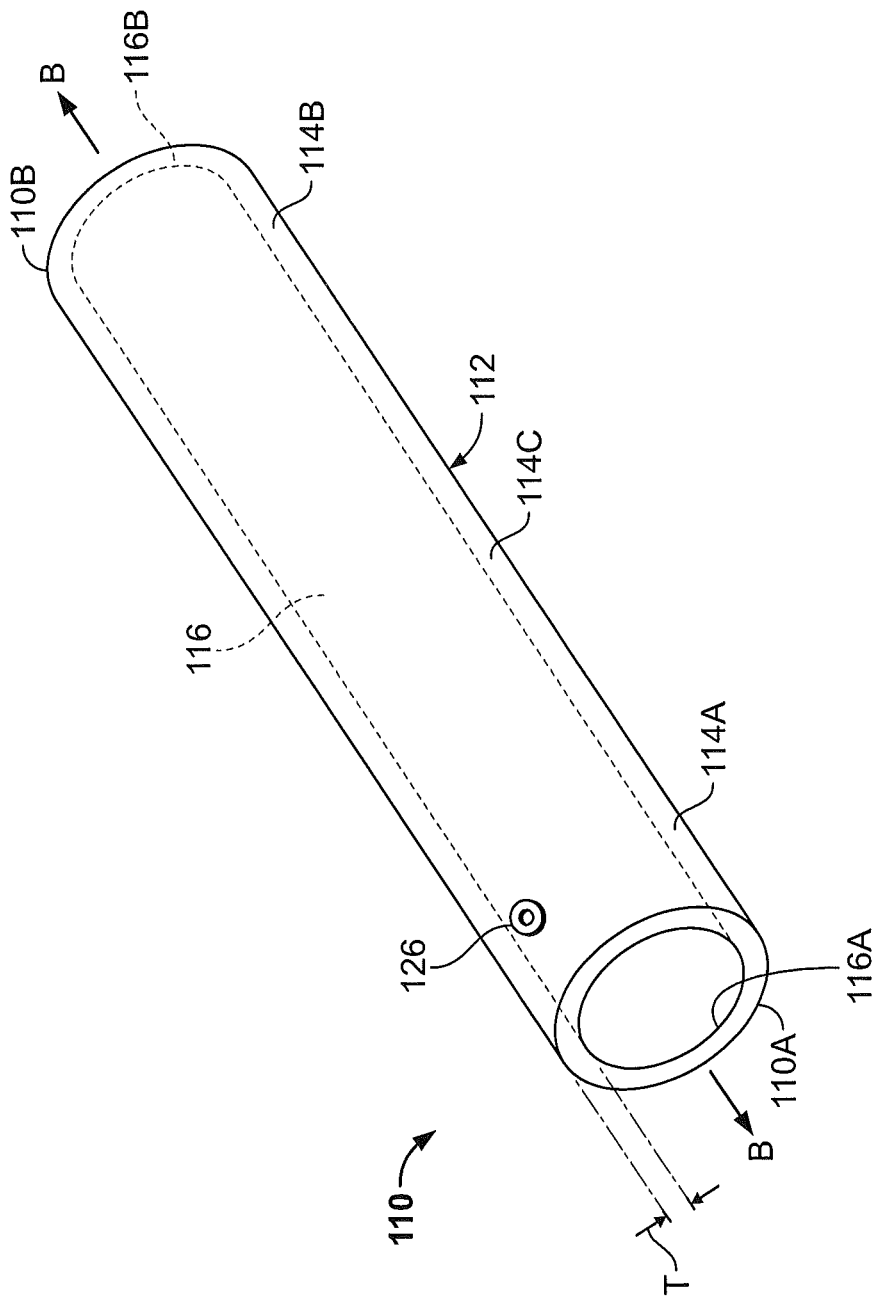
FIG. 1 is perspective view of a cover member forming a part of a cover system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well; unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

As used herein, "electrical stress grading material" (or "stress grading material") means a material that, when applied to areas of high electrical stress, relieves or reduces said stress.

As used herein, "nonbound" means that the powder or granulate is not entrained in or adhered to a further material that forms, along with the powder or granulate, a composite matrix. While other material(s) may be mixed in with the powder or granulate filler material, the powder, granulate and other materials, if any, would readily flow under force of gravity if not mechanical constrained by external support(s) or compaction.

Figure 11:
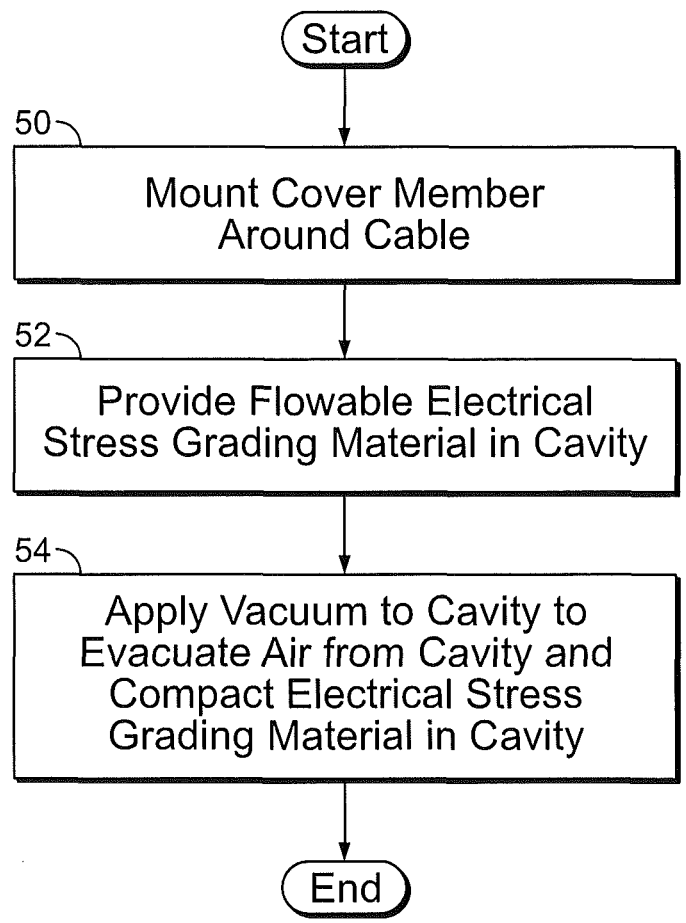
FIG. 11 is a flowchart illustrating methods according to embodiments of the present invention.

With reference to FIG. 11, a flowchart schematically representing methods for forming a cover assembly on an electrical power transmission cable according to embodiments of the present invention is shown therein. A tubular cover member is mounted around the cable such that a portion of the cover member defines a cavity surrounding the cable (Block 50). A flowable electrical stress grading material is provided in the cavity (Block 52). A vacuum is applied to the cavity to evacuate air from the cavity and compact the electrical stress grading material in the cavity (Block 54). According to some embodiments, the step of Block 50 precedes the step of Block 52. According to some embodiments, the flowable electrical stress grading material is provided in the form of a flowable powder and/or granulate.

Figure 6:
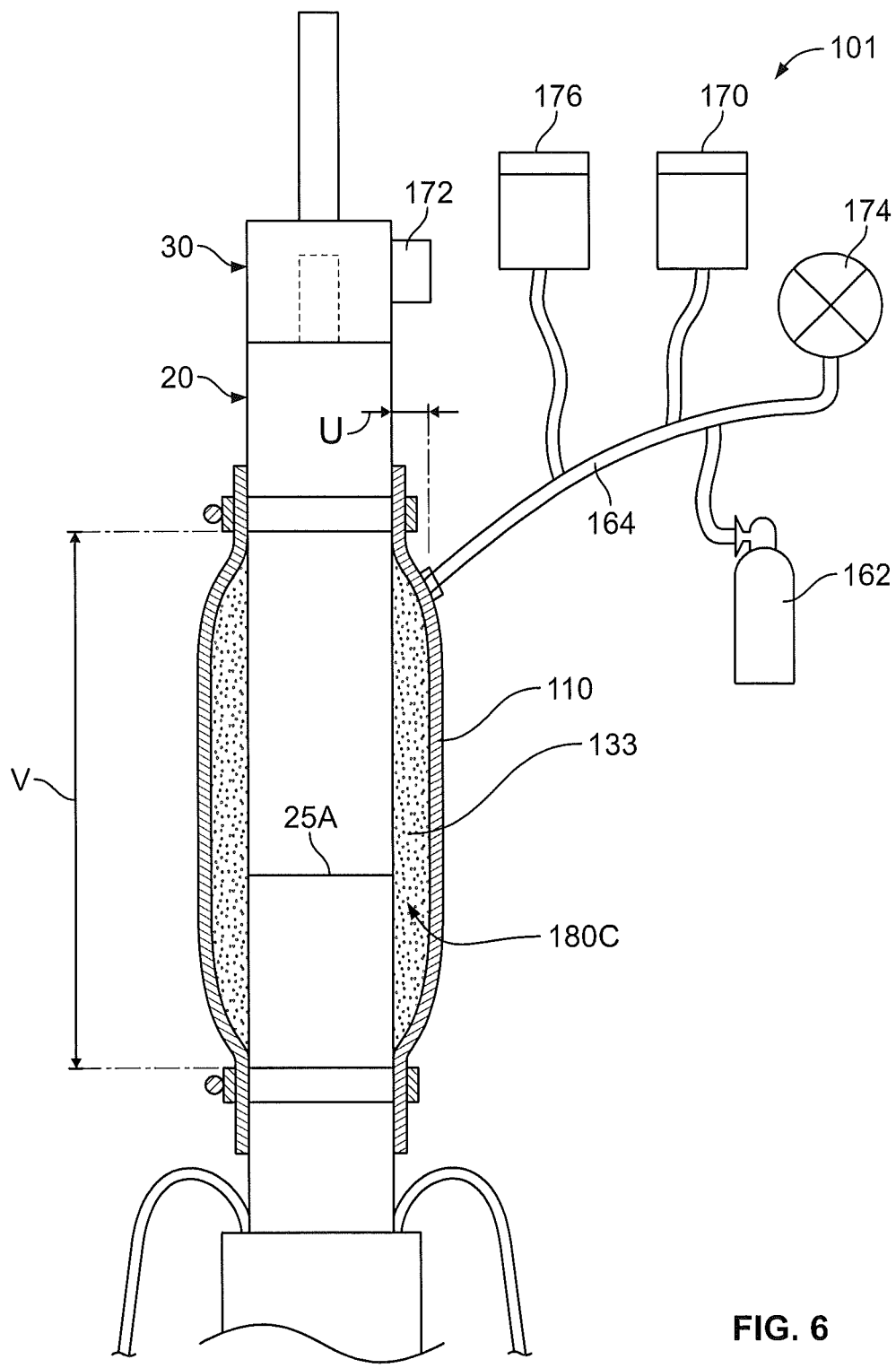
Figure 7:
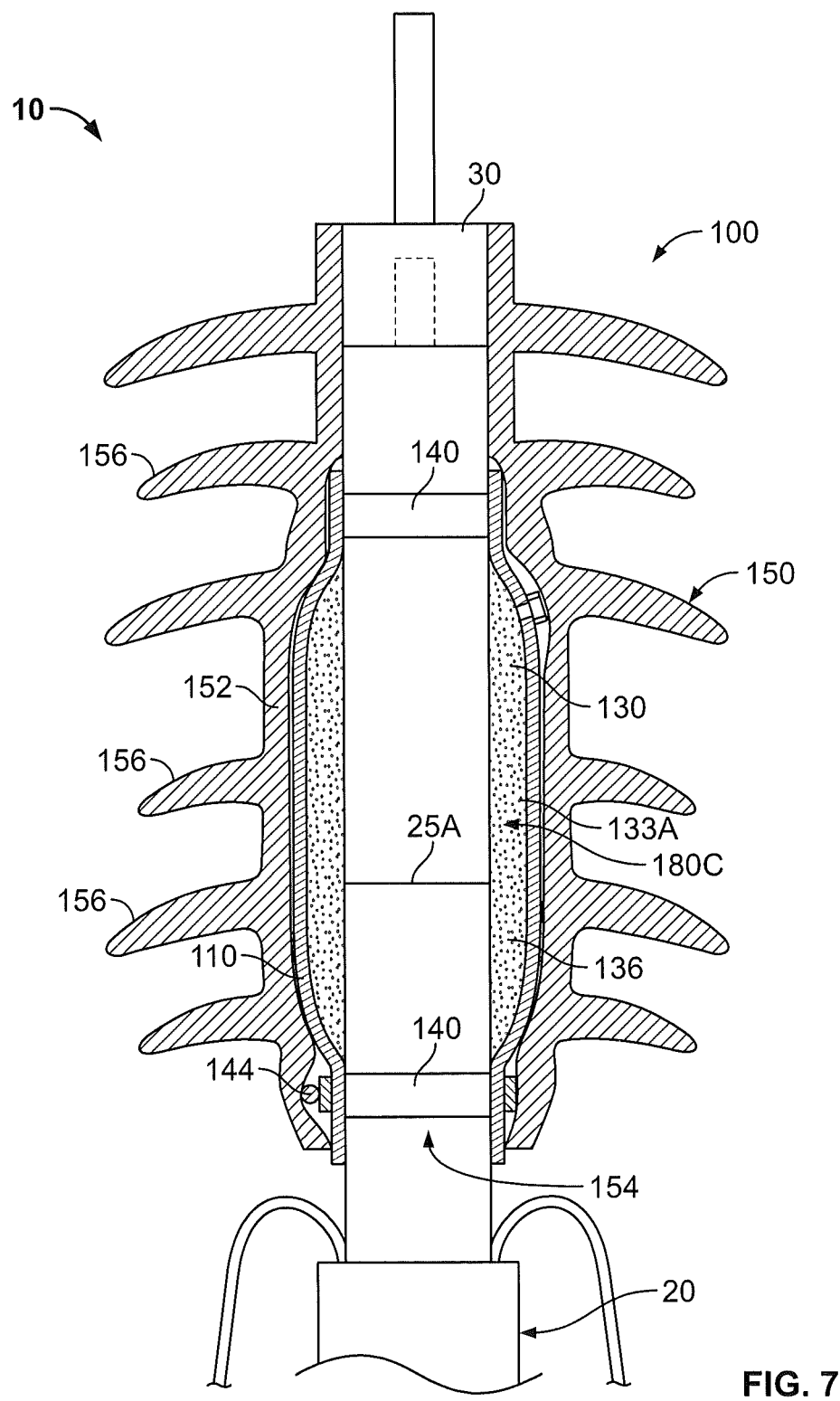

With reference to FIG. 7, a cover assembly 100 according to some embodiments of the present invention is shown therein. The cover assembly 100 may be used to form a protected cable assembly 10 including a terminated (or spliced) cable 20 and termination or connector 30. A cover system 101 according to embodiments of the invention is shown in FIG. 6 and includes the components of the cover assembly 100 and apparatus for forming and installing the cover assembly 100. In some embodiments, the cover system 101 or a portion thereof is provided as a pre-packaged kit of components for subsequent use and assembly by an installer (e.g., a field installer) using a method as described herein.

Figure 2:
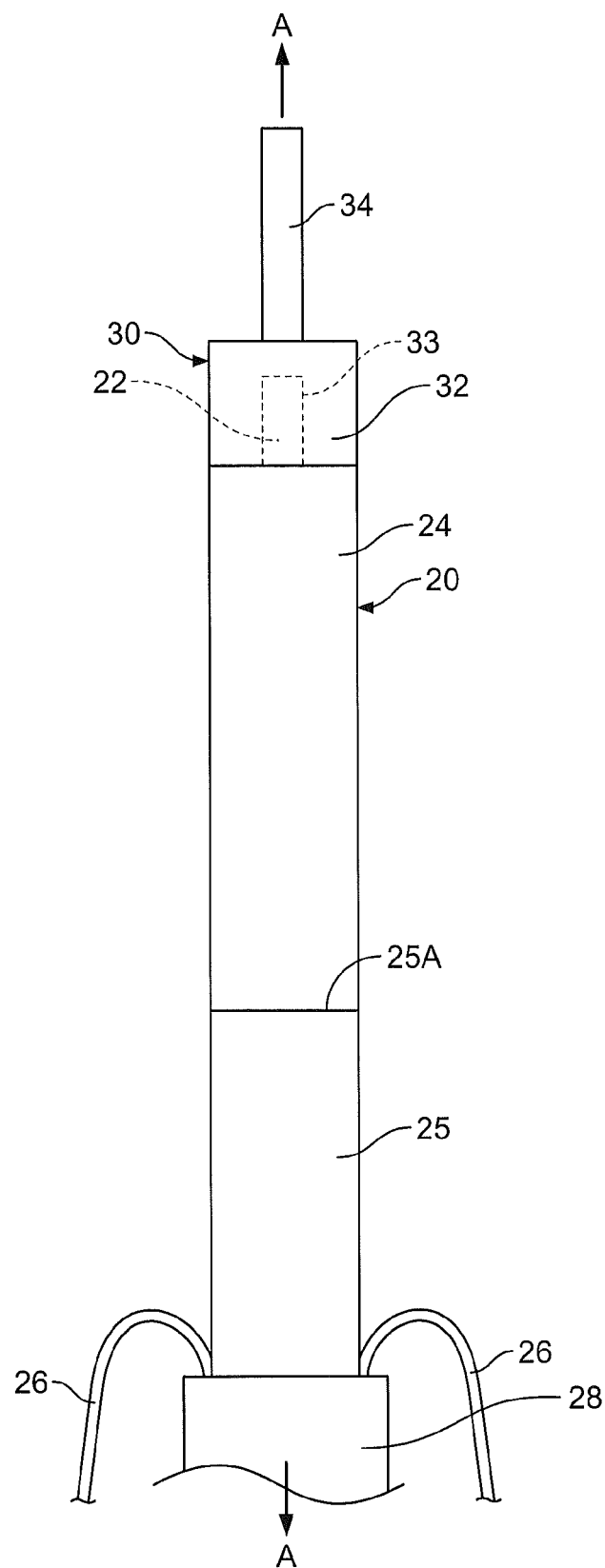
FIG. 2 is a side view of a polymer insulated cable for use with the cover system.

The cover assembly 100 can be used to electrically and mechanically shield and protect a polymer insulated electrical power transmission cable 20 (which may also be referred to as a polymeric cable). As shown in FIG. 2, the polymeric cable 20 includes a primary electrical conductor 22, a primary polymeric conductor insulation layer 24, a semiconductive layer 25, one or more neutral conductors 26, and a jacket 28, with each component being concentrically surrounded by the next. According to some embodiments and as shown, the neutral conductors 26 are individual wires, which may be helically wound about the semiconductive layer 25. The cable 20 has a lengthwise axis A-A. The primary conductor 22 may be formed of any suitable electrically conductive materials such as copper (solid or stranded). The polymeric insulation layer 24 may be formed of any suitable electrically insulative material such as crosslinked polyethylene (XLPE) or EPR. The semiconductive layer 25 may be formed of any suitable semiconductor material such as carbon black with silicone. The neutral conductors 26 may be formed of any suitable material such as copper. The jacket 28 may be formed of any suitable material such as EPDM. However, it will be appreciated that polymeric cables of other types and configurations may be used with the cover assembly 100.

According to some embodiments and as shown, the connector 30 is a crimp connector 30; however, any suitable type of electrical and mechanical connector may be employed. The illustrated connector 30 includes an electrically conductive (e.g., metal) connector body 32 and stud 34. The body 32 defines a bore 33.

The cover assembly 100 (FIG. 7) includes a cover member 110, a primary filler material 130, adhesive gasket material 140, and clamping devices 144. Optionally and as shown and described below, the cover assembly 100 further includes an outer or weather protection housing 150 and a supplemental filler material 136. According some embodiments and as described hereinbelow, the filler material 130 is a flowable powder and/or granulate. According to some embodiments and as described hereinbelow, the filler material 130 is an electrical stress grading material.

With reference to FIG. 1, the cover member 110 includes a tubular body 112 having opposed ends 110A, 110B, an annular main section 114C, opposed annular end sections 114A, 114B, an inner surface 112A and an outer surface 112B. The inner surface 112A defines a through passage 116 communicating with opposed openings 116A, 116B. A port 120 (FIG. 3) is defined in the body 112 and fitted with a nozzle 126 to enable communication with the through passage 116 through the sidewall of the body 112. A valve may be provided in the port 120 or the nozzle 126 to control flow in and/or out of the passage 116 through the port 120. The cover member 110 has a lengthwise axis B-B.

According to some embodiments, the cover member 110 is a cold shrink cover, meaning that it can be shrunk or retracted about the cable 20 without requiring the use of applied heat.

The cover member 110 can be formed of any suitable material. According to some embodiments, the cover member 110 is formed of an electrically insulative material. According to some embodiments, the cover member 110 is formed of an elastically expandable material. According to some embodiments, the cover member 110 is formed of an elastomeric material. According to some embodiments, the cover member 110 is formed of a track resistant or nontracking elastomer. According to some embodiments, the cover member 110 is formed of at least one of silicone rubber, EPDM, neoprene, butyl or polyurethane. Other suitable materials may include thermoplastic vulcanizate (TPV) or thermoplastic elastomer (TPE). According to some embodiments, the thickness T (FIG. 1) of the cover member 110 is in the range from about 0.1 mm to 2.0 mm. According to some embodiments, the cover member 110 is monolithic.

According to some embodiments, the cover member 110 has a Young's Modulus in the range of from about 0.01 to 0.1 kN/mm$^2$ and, in some embodiments, from about 0.02 to 0.04 kN/mm$^2$. According to some embodiments, the cover member 110 has a Shore A hardness in the range of from about 25 to 100 and, in some embodiments, from about 30 to 45.

The mastic 140 may be any suitable sealing mastic. According to some embodiments, the mastic 140 is formed of nitrile rubber, epichlorhydrin rubber, or fluorinated rubber. Suitable mastic materials include S1189 mastic available from TE Connectivity.

The clamping devices 144 may be any suitable clamping devices capable of applying and retaining a circumferential, radially compressive load about the cable 20. According to some embodiments, the clamping devices 144 are worm drive gear strap clamps or rigid or semi-rigid adhesive tape (e.g., glass fiber reinforced tape).

The primary filler material 130 is a flowable powder and/or granulate. According to some embodiments, the primary filler material 130 is a nonbound powder and/or granulate. According to some embodiments, the primary filler material 130 is a powder and/or granulate having an average particle size in the range of from about 0.01 to 0.2 mm and a maximum particle size in the range of from about 0.9 to 1.0 mm. More particularly, according to some embodiments, the primary filler material 130 is a powder and/or granulate having an average particle size in the range of from about 0.05 to 0.1 mm and a maximum particle size in the range of from about 0.3 to 0.5 mm.

According to some embodiments, the primary filler material 130 is an electrical stress grading material. More particularly, according to some embodiments, the primary filler material 130 is an electrical stress grading material in the form of a powder and/or granulate. According to some embodiments, the primary filler material 130 is a powder/granulate of a ceramic or metal oxide. In some embodiments, the ceramic or metal oxide includes at least one of ZnO, BaTiO$_3$ and SrTiO$_3$. According to some embodiments, the primary filler material 130 has a high permittivity (i.e., in the range of from about 20 to 5000) and non-linear electric behavior.

The supplemental filler material 136 is a flowable compound or material that can be cured or otherwise set to form a nonflowable material (e.g., a hardened resin) or less flowable material (e.g., a gel). In some embodiments, the filler material 136 is a soft, polymeric, fast curing material. Suitable materials for the supplemental filler material 136 include polyurethane, EPDM and silicone rubber.

The protection housing 150 (FIG. 7) may be of any suitable construction and materials. According to some embodiments, the protection housing 150 is formed of a track resistant or nontracking, insulating grade, UV stable polymer. Suitable materials for the protection housing 150 may include EPDM or silicone rubber, for example. Suitable protection housings may include a cold shrinkable or heat shrinkable shield member such as the 200S parts series available from TE Connectivity, for example.

Figure 4:
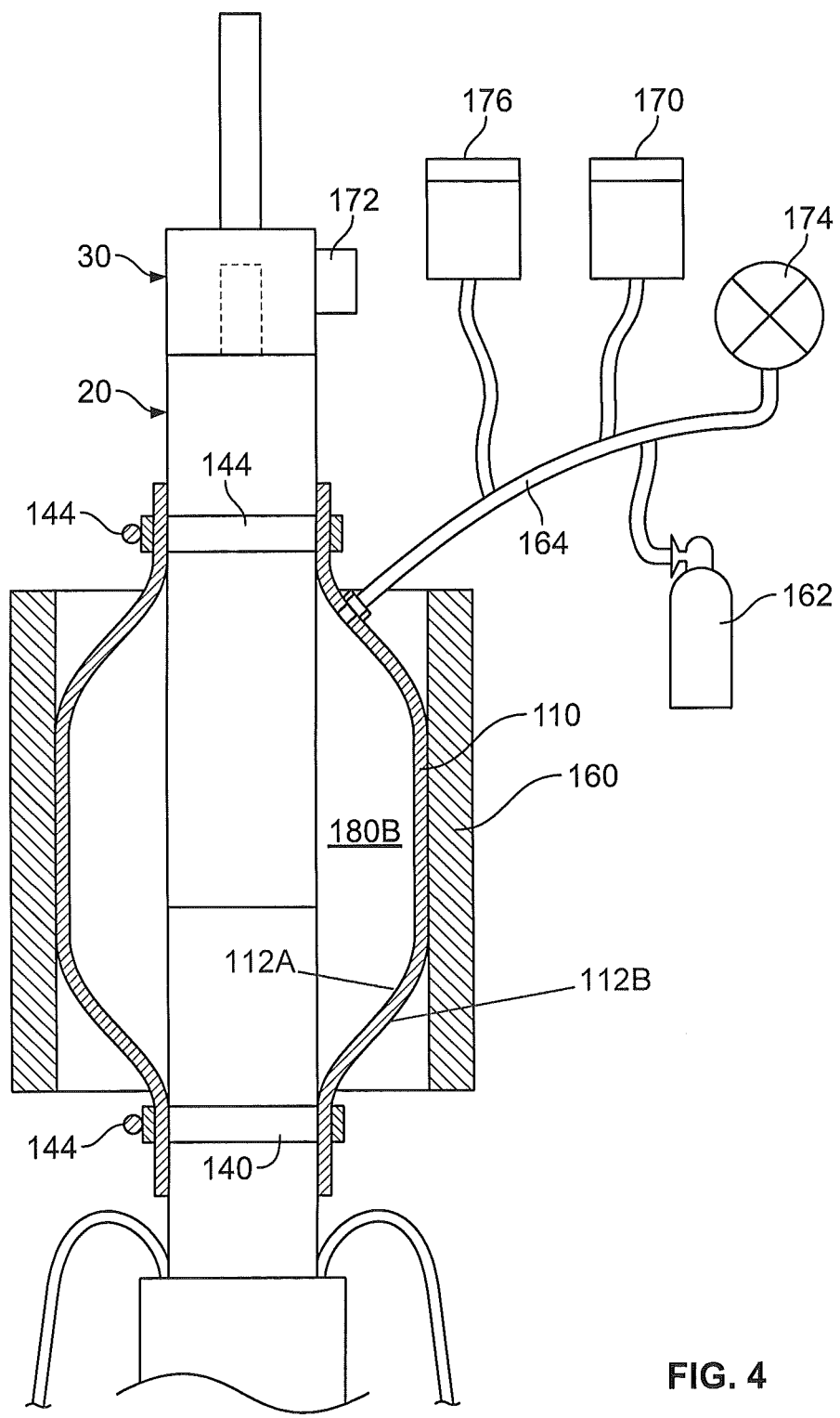

The cover system 101 further includes a frame or mold 160, a pressurized gas supply 162, a conduit network 164 (e.g., one or more lengths of flexible tubing), a supply 170 of the filler material 130, a vibrating device 172, a vacuum unit 174, and a supply 176 of the supplemental filler material 136, as shown in FIG. 4. The vacuum unit 174 may be a powered air pump (e.g., an electrically powered pump) fluidly connected to the conduit network 164. The pressurized gas supply 162 may be a canister of compressed air or a pump, for example. The pressurized gas supply 162 and the vacuum unit 174 may be a single pump unit operable to selectively supply positive and negative air pressure.

The supply 170 may include a sealed vessel holding a mass of the filler material 130 and fluidly connected to the conduit network 164. The supply 176 may include a sealed vessel holding a mass of the filler material 136 and fluidly connected to the conduit network 164. The filler material 130 and/or the filler material 136 in the supplies 170, 176 can flow freely into and through the conduit network 164 upon release from the vessels as described herein.

According to some embodiments, the mold 160 is flexible. The mold 160 may include a plurality of connected plastic rods (e.g., in the shape of a mat).

The construction of the cover assembly 100 may be further appreciated in view of methods for forming the cable assembly 10 (FIG. 7) according to embodiments of the present invention, as discussed in further detail below. However, it will be appreciated that certain of the steps and components disclosed hereinbelow may be altered or omitted in accordance with further embodiments of the invention.

With reference to FIG. 2, the cable 20 is prepared by progressively trimming back or removing end sections each layer 28, 26, 25, 24 such that a segment of each layer 26, 25, 24, 22 extends beyond the next overlying layer 28, 26, 25, 24 as shown in FIG. 2. A terminal or engagement section of the conductor 22 extends outwardly beyond the insulation 24. A section of the semiconductive layer 25 is exposed and terminates at a terminal end 25A.

Figure 3:
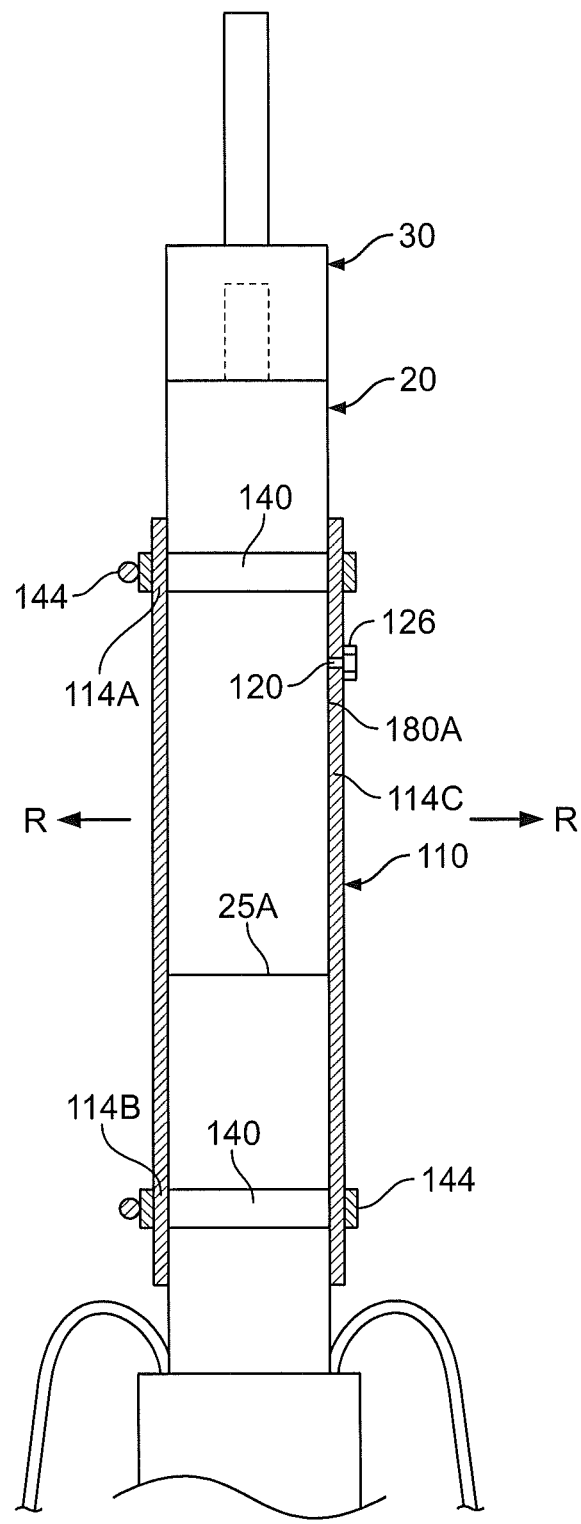

Mastic 140 is then wrapped about the cable 20 as shown in FIG. 3. More particularly, strips of the mastic 140 are wrapped or wound onto the cable 20 such that respective mastic strips 140 fully circumferentially surround the insulation 24 and the semiconductive layer 25. According to some embodiments, the mastic strips 140 directly engage and adhere to the insulation 24 and the semiconductive layer 25.

The cover member 110 is mounted around the mastic strips 140 and the cable 20 as shown in FIG. 3. More particularly, the end section 114A overlaps the insulation 24, the end section 114B overlaps the semiconductive layer 25, and the main section 114C spans the distance between the sections 114A, 114B. The cover member 110 may be installed by rolling or sliding the cover member 110 into position on the cable 20. The cover member 110 may be parked on the cable 20 with the end sections 114A, 114B rolled back on the section 114C prior to applying the mastic strips 140, and then the end sections 114A, 114B may be rolled out over the mastic strips 140 after the mastic strips 140 have been installed. Moreover, the cover member 110 may be premounted on a holdout having a greater inner diameter than the cable out diameter. The holdout is slid over the cable 20 and removed from the cover member 110 to permit the cover member 110 to contract about and onto the cable 20. Other suitable methods may be used to mount the cover member 110.

According to some embodiments, the relaxed inner diameter of the body 112 (i.e., the diameter of the passage 116) is the same as or less than the outer diameter of the insulation 24 so that the inner surface 112A positively seats or is radially loaded in compression against the outer diameter of the insulation 24. According to some embodiments, the relaxed inner diameter of the cover member 110 is at least 10 percent less than the outer diameter of the insulation 24. The elasticity of the cover member 110 may permit the use of a cover member 110 of a given size with cables 20 in a range of outer diameter sizes and may accommodate variations in the nominal outer diameter of the insulation 24 and the semiconductive layer 25 (i.e., the cover member 110 is range taking).

The clamps 144 are then tightly secured about the end sections 114A, 114B to seal the ends of the cover member 110. The clamps 144 and the mastic strips 140 will cooperate to seal a chamber, region or cavity 180A collectively defined by the inner surface 112A of the cover member 110 and the cable 20 outer diameter between the mastic strips 140. In the contracted state as shown in FIG. 3, the cavity 180A may have little or no volume.

The mold 160 is mounted around the cover member 110 and the conduit 164 is fluidly connected to the nozzle 126.

The pressurized gas supply 162 is operated to force a dry, positively pressurized gas (e.g., air) into the cavity 180A through the conduit 164 and the nozzle 126. The forced air fills the cavity 180A and radially outwardly expands (i.e., in directions R (FIG. 3)) the cover member 110 to inflate the cavity 180A to an enlarged cavity 180B as shown in FIG. 4. The seals at either end of the cover member 110 prevent air from leaking out to the environment. The cover member 110 may be inflated until it is constrained by the mold 160. The inflation and size of the cavity 180B as shown in FIGS. 4 and 5 is enlarged for the purpose of explanation, and will typically be closer to that of the cavity 180C discussed below and shown in FIG. 6.

Figure 5:
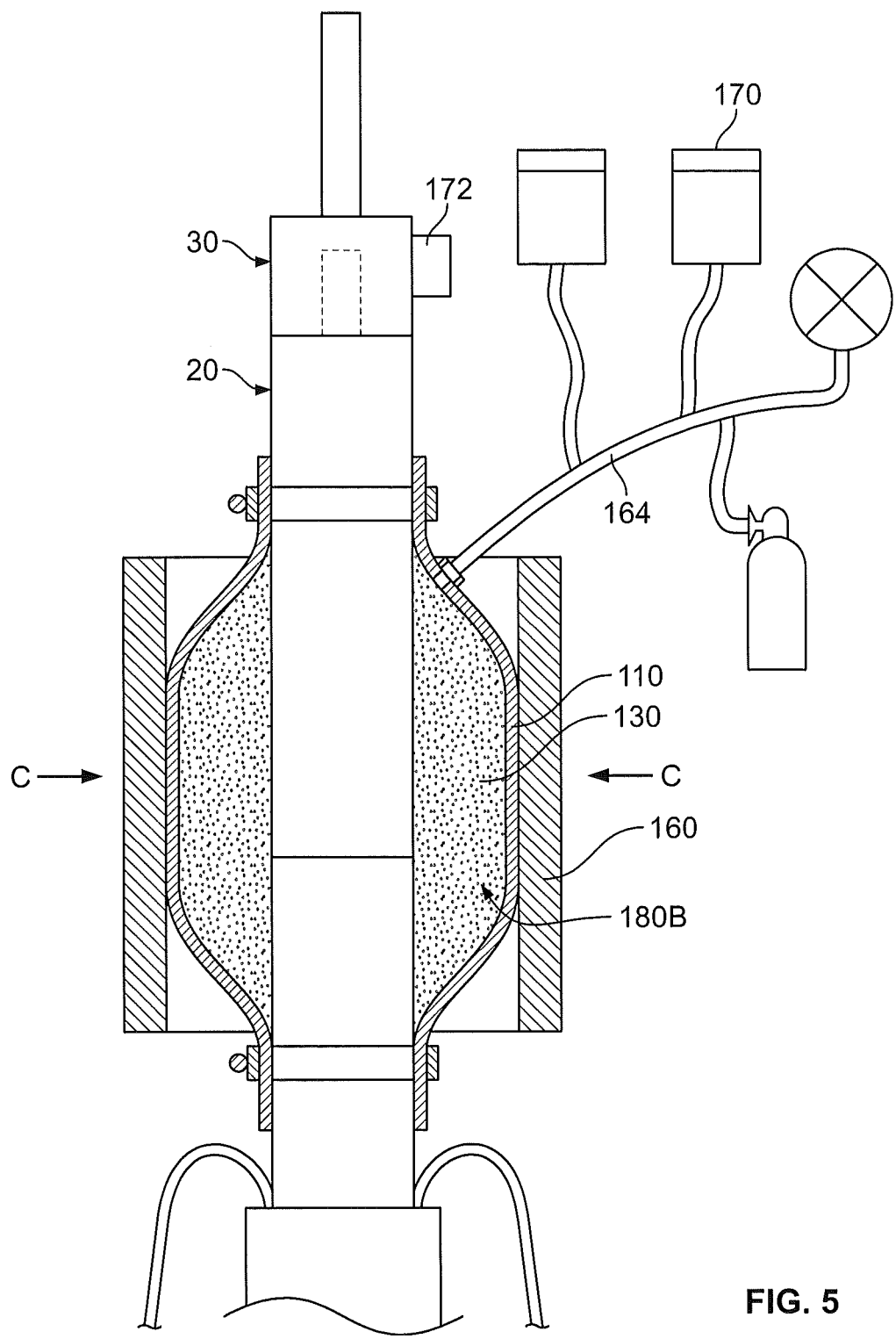

While the cover member 110 is inflated (i.e., positively pressurized) to maintain the enlarged cavity 180B, the primary filler supply 170 is opened to deliver the filler material 130 via gravity induced flow through the conduit 164 and the nozzle 126 into the cavity 180B, as shown in FIG. 5. The vibrating device 172 may be operated to speed up the filling process and to ensure that all of the space in the cavity 180B is filled up with the powder/granulate 130.

After filling with the powder/granulate 130, the pressure in the cavity 180B is released and the vacuum unit 174 is operated to generate a vacuum (negative pressure) in the cavity 180B to evacuate air therefrom. The vacuum unit 174 induces a vacuum in the cavity 180B until the cavity is drawn down to a compact cavity 180C as shown in FIG. 6. As air is drawn out of the cavity and the body 112 of the cover member 110 is drawn radially in (i.e., in directions C (FIG. 5)), the powder and/or granules of the filler material 130 are compacted or forced together to a substantially denser compacted filler structure 133. The shape of the cover member 110 and the filler material 130 is fixed by the external air pressure and the friction between the particles of the powder/granulate 130. The compacted filler structure 133 is tubular. The mold 160 can thereafter be removed.

Optionally, after compacting the filler material 130, the supplemental filler supply 176 is opened to deliver (e.g., via gravity induced flow) the supplemental filler material 136 through the conduit 164 and the nozzle 126 into the cavity 180C. The filler material 136 flows into the interstices between the particles of the compacted filler structure 133. The filler material 136 may thereafter be cured or permitted to cure (into a resin or gel, for example) to form a matrix 133A including the filler material 130 bound in the filler material 136 (FIG. 7).

The protection housing 150 or other suitable weather protection may thereafter be installed over the cable 20 and the cover assembly 100 as shown in FIG. 7. The assembly can be grounded as desired.

According to some embodiments, one or both of the clamping devices 144 are removed. In particular, the upper clamping device 144 will be removed to avoid undesirable electrical behavior. The lower clamping device 144 may be retained to resist axial displacement of the cover member 110 along the cable 20.

According to some embodiments, at least a portion of the vacuum or negative pressure generated in the cavity 180C is retained in the cavity 180C after the cover assembly 100 is fully installed and the cable assembly 10 is in service. The vacuum in the cavity 180C can be retained by the mastic strips 140 and the compression load of the electrically stretched cover member 110 on the mastic strips.

The cover assembly 100 provides an element for controlling electrical stress along the cable 20, especially at the terminal edge 25A of the semiconductive layer 25. By using a cavity 180C that is defined in part by and contiguous with the cable outer diameter, the flowable powder/granulate electrical stress grading material 130 is enabled to closely follow or conform to the outer surface of the cable 20, thereby reducing or eliminating an undesirable void at the critical semiconductive layer terminal edge 25A.

According to some embodiments, the cover member 110 with the compacted filler structure 133 is self-supporting, meaning the cover member 110 with the compacted filler structure 133 (in combination) is able to withstand mechanical forces like bending and pulling imposed by the cable 20 itself or by external forces (e.g., electro-mechanical forces during short circuits, or other conductors connected to the termination). The self-supporting termination may be capable of keeping the cable 20 straight or at a fixed position on the support structure.

The cover assembly 100 can also provide weather protection. Thus, the cover assembly 100 can provide integrated electrical stress control, weather protection and a self-supporting function.

The cover system 101 can provide a flexible and easy to apply solution for terminating cables. As discussed above, the cover member 110 may be range taking, so that the cover assembly 100 overall is range taking. That is, the cover assembly 100 can be properly installed on a range of cables of different sizes.

The seals provided by the mastic strips 140 and the clamping devices 144 at the interfaces between the cover member 110 and the cable 20 can prevent the ingress of water into the cavity 180C.

The supplemental filler material 136 can reduce the risk of electrical discharges between the individual particles of the powder/granulate 130, especially in the high electrically stressed area proximate the semiconductive layer terminal edge 25A. The supplemental filler 136 may also provide mechanical stability or strength to the cover assembly 100.

According to some embodiments, the compacted filler structure 133 has a thickness U (FIG. 6) of at least about 1 mm and, according to some embodiments, in the range of from about 1 to 30 mm. According to some embodiments, the compacted filler structure 133 has a length V (FIG. 6) of at least about 30 mm and, according to some embodiments, in the range of from about 50 to 1000 mm.

According to some embodiments, the compacted filler structure 133 has an impedance in the range of from about 4 to 500 MΩ/mm, measured at 50/60 Hertz, and a DC resistance in the range of from about 6 to 5000 MΩ/mm.

The cover member 110 may be provided in a set length or in an inventory including cover members 110 of different lengths from which the installer may choose. The cover member 110 may be trimmed to a different desired length. According to some embodiments, an endless or extended length or roll of tubing may be provided, from which the installer cuts a section that serves as the cover member 110. The cut or trimmed tubing may be customized on site during installation. The selected length of the cover member 110 may correspond to the voltage class of the termination and can be adjusted just prior to installation.

According to further embodiments, the supplemental filler material 136 is omitted, so that the completed cover assembly 110 includes the compacted filler structure 133. In this case, the powder and/or granulate of the filler material 130 remain nonbound, but may be contained or restrained by the cover member 110 (which may exert a persistent compressive force on the compacted filler structure 133.

Figure 8:
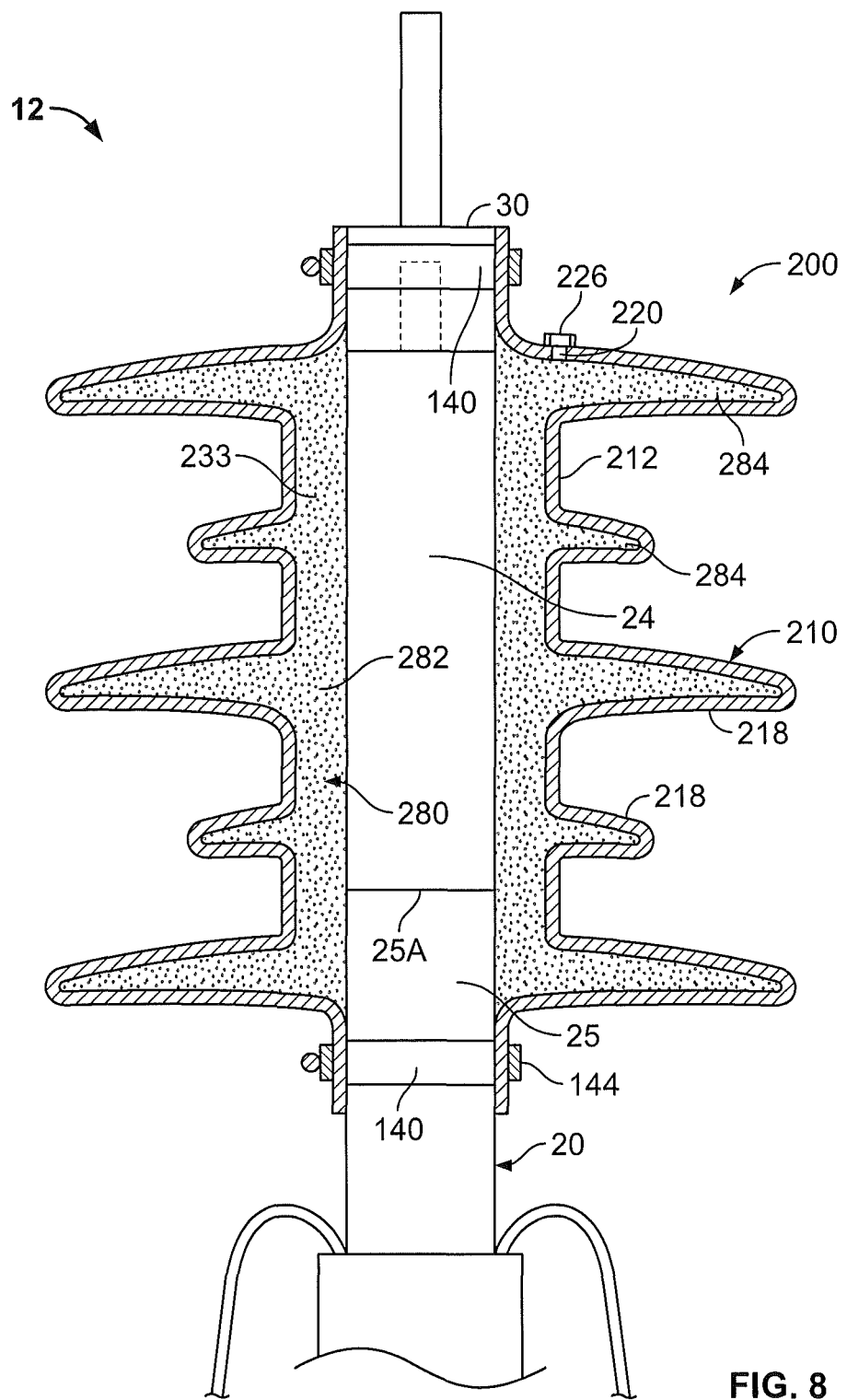
FIG. 8 is a partial cross-sectional view of a cover system according to further embodiments of the present invention installed on the cable of FIG. 2.

With reference to FIG. 8, a cable assembly 12 according to further embodiments of the present invention is shown therein. The cable assembly 12 can be constructed and assembled in the same manner as the cable assembly 10, except as follows. The cable assembly 12 incorporates cover assembly 200 having a cover member 210 in place of the cover member 110 and a compacted filler structure 233 in place of the compacted filler structure 133A. The compacted filler structure 233 may be formed of the material(s) and in the manner described above for the structure 133 or the structure 133A.

The cover member 210 includes a main body 212 and integral sheds 218 extending radially outwardly from the main body 212. A cavity 280 is defined between the cover member 210 and the cable 20 and includes a main cavity portion 282 and shed cavity portions 284. A port 220 and a nozzle 226 corresponding to the port 120 and the nozzle 126 fluidly communicate with the cavity 280.

The cover member 210 can be mounted on the cable 20, inflated, filled with filler material 130 (e.g., powder and/or granulate electrical stress grading material), and vacuum evacuated in the same manner as described above for the cover member 110.

Figure 9:
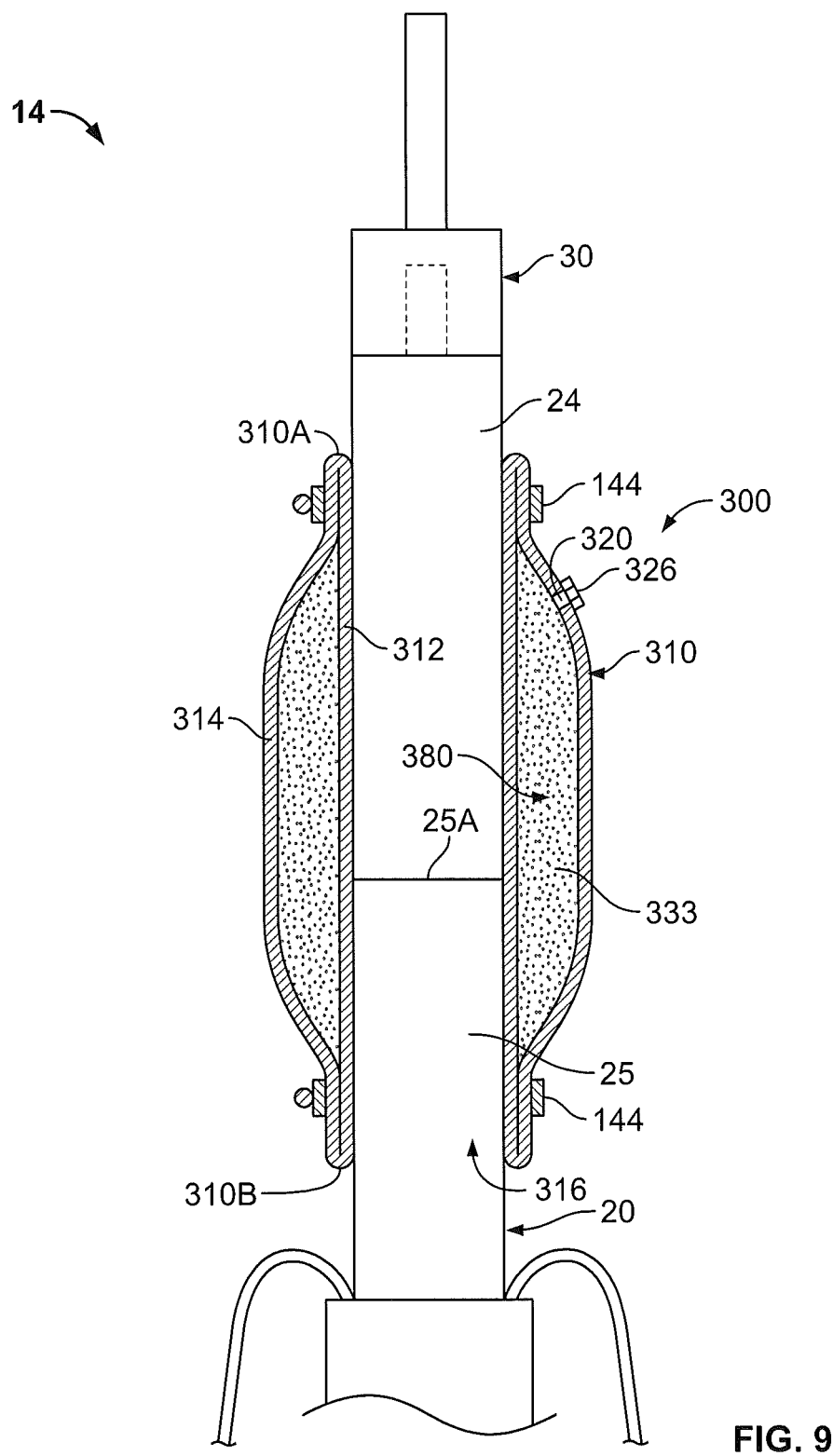
FIG. 9 is a partial cross-sectional view of a cover system according to further embodiments of the present invention installed on the cable of FIG. 2.
Figure 10:
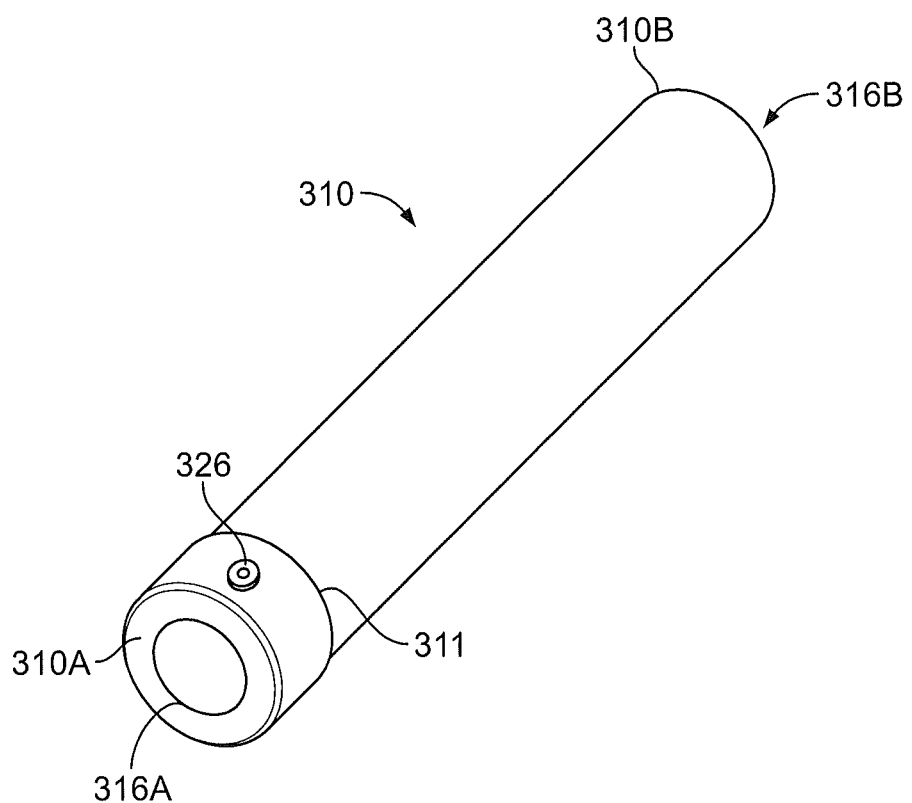
FIG. 10 is a perspective view of a cover member forming a part of the cover system FIG. 9.

With reference to FIGS. 9 and 10, a cable assembly 14 according to further embodiments of the present invention is shown therein. The cable assembly 14 can be constructed and assembled in the same manner as the cable assembly 10, except as follows. The cable assembly 14 incorporates a cover assembly 300 having a cover member 310 in place of the cover member 110 and a compacted filler structure 333 in place of the structure 133A. The compacted filler structure 333 may be formed of the same material(s) and in the same manner described above for the structure 133 or the structure 133A.

Referring to FIGS. 9 and 10, the cover member 310 is a tubular, integral, double-walled sleeve of a unitary or single piece construction. The cover member 310 extends from a first end 310A to a second end 310B. The cover member 310 has an inner wall 312 and an outer wall 314 joined at the ends 310A, 310B. As will be appreciated from the description herein and the drawings, the walls of the cover member 310 form an endless, continuous band (closed by an annular seam 311) that is axially revolvable about itself so that the portions thereof that constitute the inner wall 312 and the outer wall 314 at any given time may vary depending on the position of the cover member 310. Likewise, the portions of the cover member 310 positioned at the ends 310A, 310B will change as the cover member 310 is revolved or rolled. That is, when the cover member 310 is revolved along its axis, the cover member 310 will evaginate (i.e., turn inside-out by eversion of the inner wall) at one end and invaginate (i.e., turn outside-in by inversion of the outer wall) at the other (opposite) end. An annular or tubular cavity 380 (FIG. 9) is defined between the inner wall 312 and the outer wall 314. The cover member 310 has a central lengthwise axis. The inner wall 312 defines an axially extending through passage 316 that communicates with opposed end openings 316A, 316B.

The cover member 310 can be formed of any suitable material. According to some embodiments, the cover member 310 is formed of an electrically insulative material. According to some embodiments, the cover member 310 is formed of an elastically expandable material. According to some embodiments, the cover member 310 is formed of an elastomeric material. According to some embodiments, the cover member 310 is formed of a track resistant or nontracking elastomer. According to some embodiments, the cover member 310 is formed of at least one of silicone rubber, EPDM, neoprene, butyl or polyurethane. Other suitable materials may include thermoplastic vulcanizate (TPV) or thermoplastic elastomer (TPE).

The cover member 310 can be mounted on the cable 20 by rolling the double walled structure into position on the cable 20. The cover member 310 can be secure in place by clamping devices 144. The cavity 380 can then be inflated, filled with filler material 130 (e.g., powder and/or granulate electrical stress grading material), and vacuum evacuated in the same manner as described above for the cover member 110 through the nozzle 326 and port 320.

A shaping mold (e.g., the mold 160) as described herein can serve to determine the shape of the cover assembly formed. The mold can have any suitable shape, such as cylindrical or cone shaped. In particular, the mold cavity and the cover assembly may be cone shaped with the larger end of the cone being proximate the cable jacket in consideration of the fact that the capacitance of the refractive stress should be high, at the semiconductive layer terminal edge 25 and low at the end proximate the connector 30. External strength members may be used to fortify the cover assembly.

According to further embodiments, the filler material 130 may be flowable material other than a powder and/or granulate, to which a vacuum is applied as described herein.

Cover systems and cover assemblies according to embodiments of the invention may be used for any suitable cables and connections. Such cover systems and cover assemblies may be adapted for use, for example, with connections of medium voltage cables (i.e., between about 6 and 42 kV), and high voltage cables (i.e., between about 52 and 145 kV).

The clamping devices (e.g., the clamping devices 144) may be integrated into the cover members (e.g., the cover members 110, 210, 310). In some embodiments, the clamping devices may be removed after the cavity is evacuated.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for forming a cover assembly on an electrical power transmission cable, the method comprising:

mounting a tubular cover member around the cable such that a portion of the cover member defines a cavity surrounding the cable;

providing a flowable electrical stress grading material in the cavity; and applying a vacuum to the cavity to evacuate air from the cavity and thereby draw the cover member radially inwards to compact the electrical stress grading material in the cavity.

2. The method of claim 1 wherein the electrical stress grading material is a flowable powder and/or granulate.

3. The method of claim 1 including filling the cavity with the electrical stress grading material after mounting the cover member on the cable and before applying the vacuum to the cavity.

4. The method of claim 3 including mounting a mold around the cover member on the cable to control the shape of the cover member during the step of filling the cavity with the electrical stress grading material.

5. The method of claim 3 including:
injecting pressurized gas into the cover member on the cable to inflate and expand the cover member into an expanded state to form the cavity; and
filling the cavity with the electrical stress grading material while the cover member is in the expanded state.

6. The method of claim 1 wherein:
the cover member is formed of an elastomeric material and has an inner diameter equal to or less than an outer diameter of the cable; and
mounting the cover member around the cable includes elastically radially expanding the cover member about the cable.

7. The method of claim 1 including:
placing a flowable void filling material in the cavity to fill voids in the electrical stress grading material in the cavity; and
permitting the void filling material to thereafter cure to form a rigid or semi-rigid structure with the electrical stress grading material.

8. The method of claim 1 wherein the electrical stress grading material in the cavity directly contacts the cable.

9. The method of claim 1 wherein the cover member includes a tubular inner wall and a tubular outer wall defining the cavity therebetween, and the inner wall is interposed between the cavity and the cable.

10. The method of claim 1 including applying an adhesive gasket material between the cover member and the cable to seal the cover member to the cable and to seal an end of the cavity.

11. The method of claim 1 including mounting a clamping device on the cover member to circumferentially compress the cover member about the cable and thereby secure the cover member to the cable.

12. The method of claim 1 including installing an outer protection housing over the cover member.

13. The method of claim 1 including forming the cavity and installing the electrical stress grading material around a terminal end of a semiconductive layer of the cable.

14. The method of claim 1 wherein the electrical stress grading material includes a ceramic oxide and/or a metal oxide.

15. The method of claim 1 wherein the step of applying the vacuum to the cavity includes applying the vacuum to the cavity using a vacuum generator.

16. The method of claim 1 wherein a port is defined in a wall of the cover member and communicating with the cavity, and the method includes filling the cavity with the electrical stress grading material through the port.

17. The method of claim 1 wherein a port is defined in a wall of the cover member and communicating with the cavity, and the method includes evacuating the air from the cavity through the port.

18. The method of claim 1 wherein the cover member includes a tubular body and at least one shed integral with and extending radially outwardly from the body.

19. The method of claim 1 including compacting the electrical stress grading material in the cavity to form a rigid or semi-rigid structure.

20. The method of claim 18 wherein the cavity surrounding the cable includes a shed cavity portion defined within the at least one shed, and the method includes:
providing the flowable electrical stress grading material into the shed cavity portion; and
applying a vacuum to the shed cavity portion to evacuate air from the shed cavity portion and thereby compact the electrical stress grading material in the shed cavity portion.

21. The method of claim 20 wherein the cover member, including the at least one shed, is formed of an elastomeric material.

* * * * *